June 16, 1942. A. A. SCARLETT ET AL 2,286,312
CULTIVATING IMPLEMENT
Filed July 25, 1940  3 Sheets-Sheet 1

Inventor
A.A. Scarlett.
S.M. Young.
By Paul O. Pippel
Att'y.

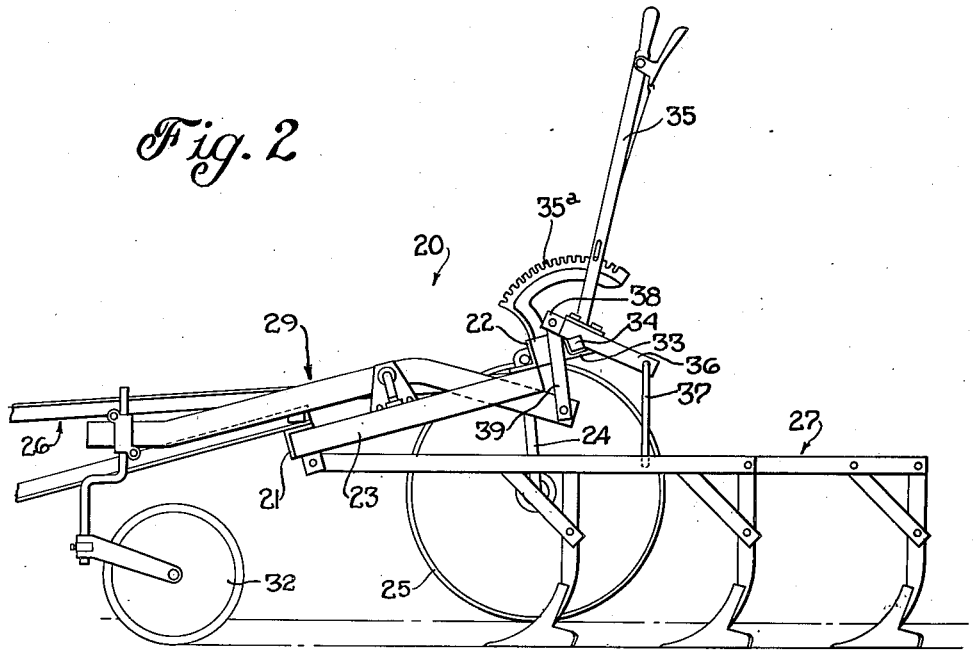
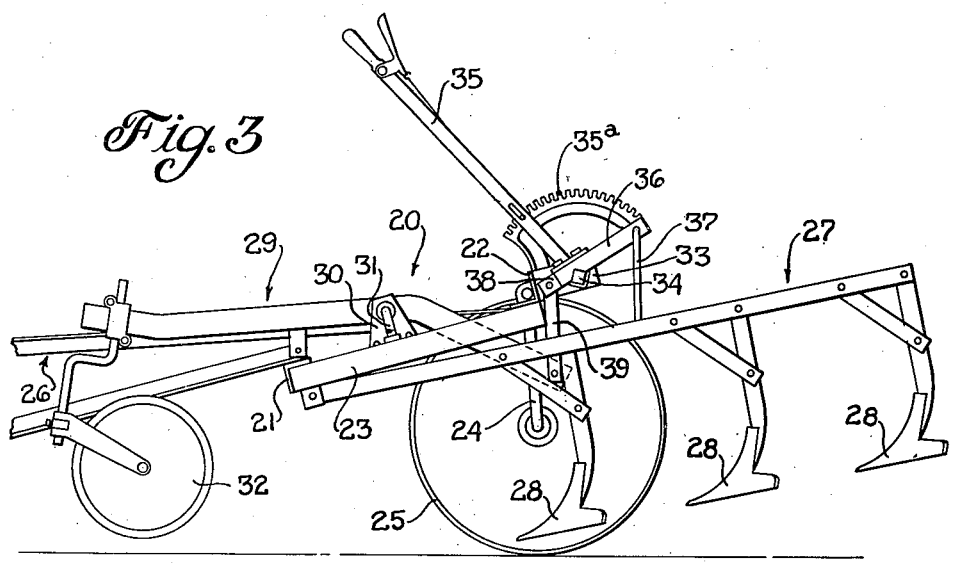

Inventor
A. A. Scarlett
S. M. Young
By Paul O. Pippel
Att'y.

Patented June 16, 1942

2,286,312

UNITED STATES PATENT OFFICE 2,286,312

CULTIVATING IMPLEMENT

Arthur A. Scarlett and Stephen M. Young, Hamilton, Ontario, Canada, assignors, by mesne assignments, to International Harvester Company, Chicago, Ill., a corporation of New Jersey Application July 25, 1940, Serial No. 347,438

7 Claims. (Cl. 97—145)

The present invention relates to cultivating implements. More specifically it relates to a lister basin leveling attachment for cultivators.

In order to conserve moisture in a field it is the practice today to form moisture retaining basins by making ridges in the field and forming basins between the ridges. When the field is to be prepared for planting it is desirable to level off these ridges.

It is, therefore, an object of the present invention to provide a cultivator attachment which will level off lister ridges in a field.

Another object is to provide a cultivator with a coulter attachment for splitting the ridges.

Another object is to provide a novel mounting for a coulter.

Another object is to provide a novel lifting and lowering means for a rolling coulter and cultivator rigs.

According to the present invention a cultivator is provided with coulters which are arranged so as to cut through the center of the ridge. The earth-working tools of the cultivator are arranged so that certain tools operate at the center of the ridge and other tools operate at the sides of the ridge.

These and other objects and advantages of the present invention will be apparent to those skilled in the art after a consideration of the following detailed description of the preferred structural embodiment, taken in conjunction with the accompanying drawings.

In the drawings:

Figure 2 is a sectional view taken along the line 2—2 of Figure 1, showing the coulter and cultivator shovels in an operating position;

Figure 3 is a sectional view, similar to Figure 2, but showing the coulter and cultivator shovels in a raised position;

Figure 4:
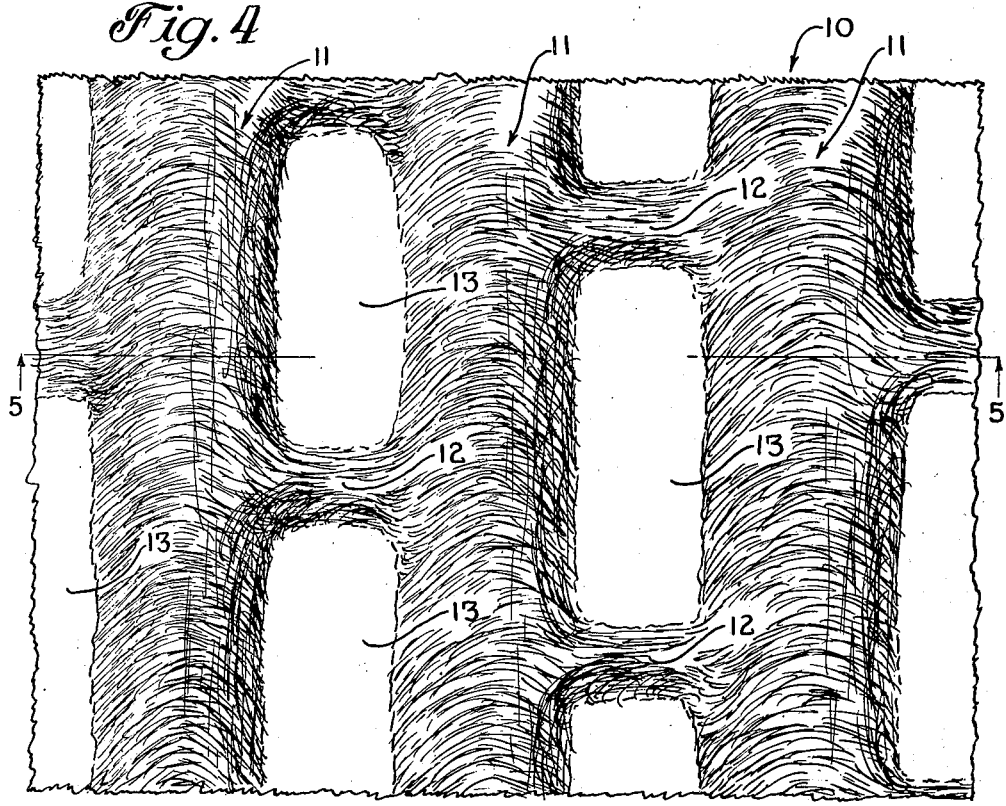
Figure 4 is a diagrammatic view of the field in which the cultivator operates.
Figure 5:
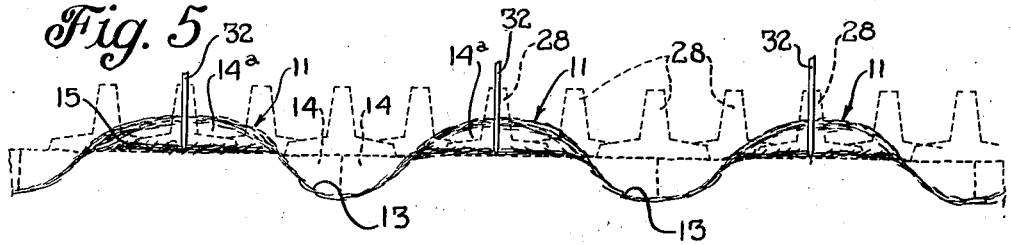
Figure 5 is a sectional view taken along the line 5—5 of Figure 4 showing the position of the coulters and the shovels with respect to the ridges.

Referring now to Figures 4 and 5 it will be seen that the field 10 has a plurality of ridges 11 between which are formed dams 12. The dams 12 and the ridges 11 form moisture retaining basins 13. As shown in Figure 5 the ridge 11 is formed by cutting through the ground and moving the portions 14 thereof over into the position 14a. The weeds 15 on top of the ground are sandwiched between the ridge, as shown in Figure 5.

The cultivator, indicated in its entirety by the reference numeral 20, consists of an inclined rectangular frame structure which has front and rear angle bars 21 and 22 that are connected together by generally longitudinally arranged bars 23. At opposite ends of the rear angle bar 22 there are secured axles 24 on which are journaled wheels 25. A draft hitch 26 is connected to the front and rear angles 21 and 22.

Figure 1:
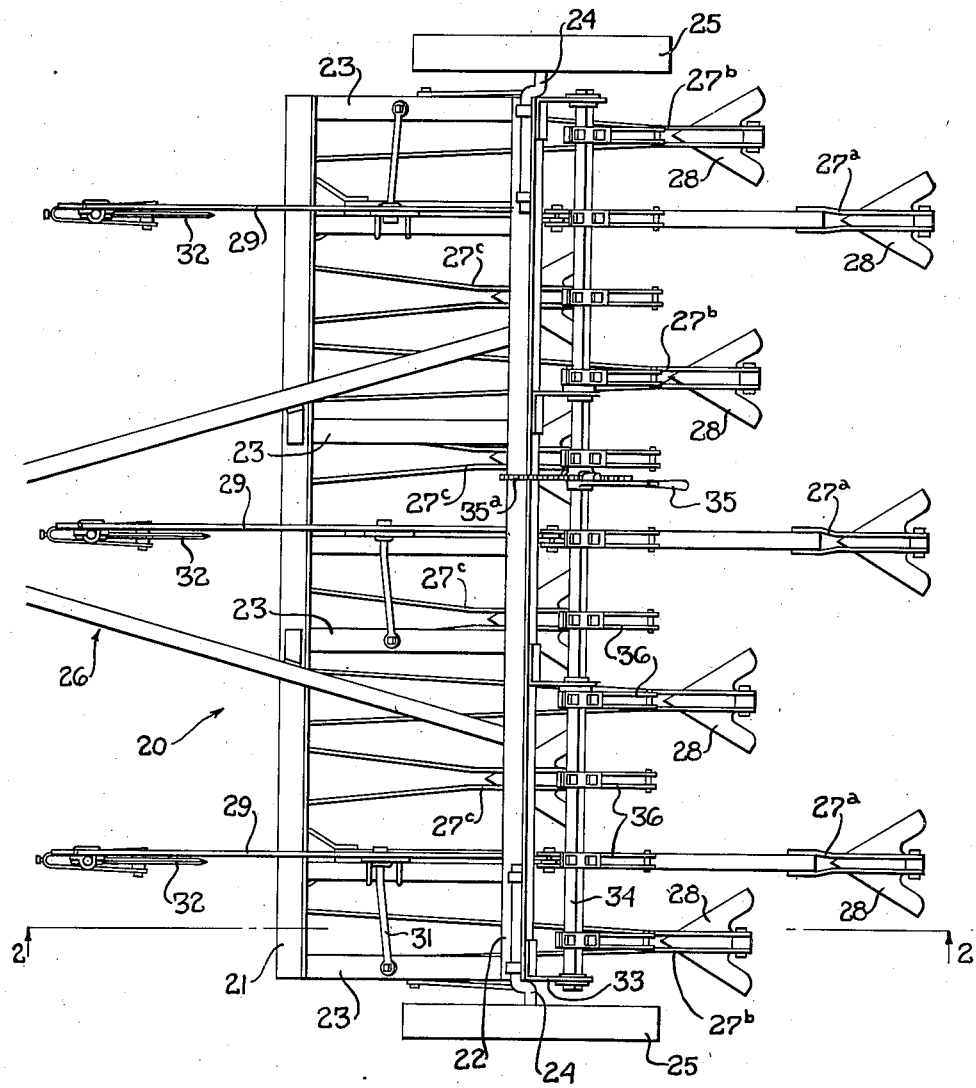
Figure 1 is a plan view of the cultivator with the coulter attachment provided thereon.

On the front angle 21 of the frame 20 is pivotally connected a plurality of cultivator rigs 27 which are provided with the usual earth-working tools 28. The rigs 27 are arranged so that the earth-working tools 28 thereon are in overlapping relation. As shown in Figures 1 and 5, the long rigs 27a are arranged so as to operate at the center of the ridges 11, and the intermediate and short length rigs 27b and 27c operate at the sides of the ridge. In this way the ridges 11 are leveled off into the basins 13.

A plurality of the longitudinally arranged members 29 are pivotally connected by means of bolts 31 to the plates 30 which are bolted to the bars 23. On the front end of each of the members 29 is mounted a rolling coulter 32 which is adapted to operate at the center of the ridge 11 so as to split it, and also to cut through the weeds 15. The members 29 extend rearwardly beyond their pivotal connection to the frame.

On the rear angle 22 a plurality of brackets 33 are secured in which is journaled a rock-shaft 34. A lever 35 connected to the rock-shaft 34 adjusts the rock-shaft and is locked to a sector 35a which is secured to the rear angle 22; however, a power lift or similar type of power device could be used to adjust the rock-shaft. A plurality of arms 36 are secured on the rock-shaft 34, and links 37 connect the arms 36 and the rigs 27. A plurality of arms 38 are also secured on the rock-shaft 34. Links 39 are connected to the rear ends of the members 29 and to the arms 38.

Figure 6:
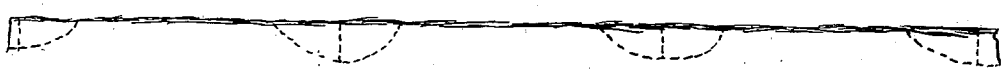
Figure 6 is a sectional view of the field after the ridges have been eliminated.

Referring to Figures 2 and 5, the rigs 27 and the coulter 32 are shown in an operating position. The coulter 32 operates at the center of the ridge and cuts through the ridge 11 and the weeds 15. The earth-working tools 28 operate at the center and at the sides of the ridge so as to level off the ridge. The portions 14a of the ridge are moved by the earth-working tools 28 to the sides of the ridge, and the field is leveled off as shown in Figure 6.

By adjusting the lever 35 the rigs 27 and the coulters 32 can be raised to a transport position as shown in Figure 3. The movement of the rock-shaft 34 through the links 37 lifts the rigs 27 about their pivotal connections to the frame, and through the links 39 the members 29 are moved about their pivotal connection to the frame so as to lift the coulters out of the ground.

From the foregoing description it is obvious that a novel implement for leveling off lister ridges has been provided. The entire surface of the field is operated upon by the earth-working tools and the tools and the coulter can be raised or lowered simultaneously.

While a preferred embodiment of the present invention has been described, it is to be understood that the invention is not to be limited to the specific details shown, but that widely different means may be employed in the practice of the broader aspects of our invention.

What is claimed is:

1. An implement of the type adapted to eliminate basin lister ridges comprising a wheeled frame, coulters pivotally mounted on the frame and adapted to operate generally at the center of the ridges so as to split said ridges, earth-working means pivotally mounted on the frame and associated with the center and the sides of the ridges for leveling off said ridges, and a single control means mounted on the frame and operatively associated with the coulters and the earth-working means for adjusting said coulters and said earth-working means about their pivotal connections to the frame.

2. An implement of the type adapted to eliminate basin lister ridges comprising a wheeled frame, coulters pivotally mounted on the frame and adapted to operate generally at the center of the ridges so as to split said ridges, earth-working means pivotally mounted on the frame and associated with the center and the sides of the ridges for leveling off said ridges, and a single control means for simultaneously adjusting said coulters and said earth-working means about their pivotal connections to the frame.

3. In a machine of the class described, comprising a wheeled frame, a plurality of longitudinally arranged members pivotally mounted on the frame, a coulter mounted on each of said members and adapted to cut through the lister ridge, earth-working tools pivotally mounted on the frame and arranged to level off the ridge, and a single adjusting means mounted on the frame and operatively connected to the members and to the tools for simultaneously adjusting said members and said tools about their pivotal connections to the frame.

4. In a cultivator having a wheeled frame, earth-working tools pivotally connected to said frame, means mounted on the frame and operatively connected to the tools for adjusting said tools about their pivotal connection to the frame, a plurality of members pivotally mounted on the frame and extending forwardly thereof, coulters mounted on the forwardly extending portions of said members, and means operatively connected to said first mentioned means and to said members in such a manner that the tools and the members can be simultaneously adjusted.

5. A cultivator comprising a frame, wheel supports for the frame, a plurality of earth-working tools pivotally connected to the frame, a rock-shaft journaled on the frame and operatively connected to said earth-working tools for raising and lowering the same, means operatively connected to the rock-shaft for rotating the same, a plurality of longitudinally arranged bars pivoted intermediate their ends to the frame, a coulter mounted at one end of the bar, and means connected to the other end of the bar and operatively connected to the rock-shaft in such a manner that by adjusting the rock-shaft and longitudinally arranged bars and the earth-working tools will be adjusted simultaneously about their pivotal connections to the frame.

6. A cultivator comprising a frame, wheel supports for the frame, a plurality of earth-working tools pivotally connected to the frame, a rock-shaft journaled on the frame and operatively connected to said earth-working tools for raising and lowering the same, means operatively connected to the rock-shaft for rotating the same, a plurality of longitudinally arranged members pivoted intermediate their ends to the frame and extending forwardly and rearwardly thereof, a coulter mounted on each of the forward ends of said members, a plurality of arms extending to one side of the rock-shaft, link means connected to said arms and to the earth-working tools, a plurality of arms extending to the other side of the rock-shaft, and link means connected to said arms and to the members.

7. In combination, a wheeled frame, a plurality of earth-working tools pivotally connected to the frame, a rock-shaft journaled on the frame, means mounted on the frame and operatively connected to the rock-shaft for rotating the same, means operatively connected to the rock-shaft and to the tools for raising and lowering the tools upon rotation of the rock-shaft, a plurality of longitudinally arranged members pivoted intermediate their ends to the frame and extending forwardly and rearwardly thereof, a coulter mounted on each of the forward ends of said members, and means operatively connected to the rear ends of said members and to said rock-shaft in such a manner that upon rotation of the rock-shaft the members will be moved about their respective pivotal connections to the frame and the tools will be moved about their pivotal connections to the frame.

ARTHUR A. SCARLETT.
STEPHEN M. YOUNG.